United States Patent
Ravindranath et al.

(10) Patent No.: US 7,899,166 B1
(45) Date of Patent: Mar. 1, 2011

(54) FLEXIBLE BILLING SUPPORT IN A SERVICE SELECTION GATEWAY (SSG)

(75) Inventors: Vinodh Kumar Ravindranath, Bangalore (IN); Kotha Subba Rama Chandra Murty, Bangalore (IN); Navneet Agarwal, Bangalore (IN); Marco Cesare Centemeri, Rho (IT); Amit S. Phadnis, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1664 days.

(21) Appl. No.: 10/418,719

(22) Filed: Apr. 18, 2003

(51) Int. Cl.
*H04M 15/00* (2006.01)
*H04M 11/00* (2006.01)
*H04L 12/66* (2006.01)

(52) U.S. Cl. ............... 379/114.2; 379/114.06; 370/352; 455/406

(58) Field of Classification Search ............ 370/351, 370/395.2, 395.21, 395.3, 395.41, 395.43, 370/401, 468, 493, 259; 379/114.01, 114.06, 379/114.07, 114.09, 114.15, 114.16, 114.17, 379/114.2; 455/405–408
See application file for complete search history.

(56) References Cited

U.S. PATENT DOCUMENTS

| | | | | |
|---|---|---|---|---|
| 5,946,380 A | * | 8/1999 | Cohen et al. | 379/127.01 |
| 6,249,573 B1 | * | 6/2001 | Hudson | 379/114.2 |
| 2002/0029189 A1 | * | 3/2002 | Titus et al. | 705/39 |
| 2002/0116338 A1 | * | 8/2002 | Gonthier et al. | 705/52 |
| 2003/0050041 A1 | * | 3/2003 | Wu | 455/406 |
| 2004/0048600 A1 | * | 3/2004 | Madour et al. | 455/408 |
| 2004/0106393 A1 | * | 6/2004 | Chowdhury et al. | 455/406 |
| 2004/0156340 A1 | * | 8/2004 | Madour | 370/335 |
| 2009/0047992 A1 | * | 2/2009 | Ortiz et al. | 455/552.1 |

OTHER PUBLICATIONS

Entitled:"Node Route Processor—Service Selection Gateway Enhancements II", Published on: Mar. 26 14:56:36 PST2000, Available at: http://www.cisco.com/univercd/cc/td/doc/product/software/ios122/122newft/122limit/122b/122b_4/122b4_sg, (pp. 17).

Entitled:"Data Sheet: Cisco Service Selection Gateway", Published on: Oct. 7 21:07:17 PDT 2001, Available at: http://www.cisco.com/warp/public/cc/pd/as/6400/prodlit/ssgw_ds.htm, ( pp. 3).

Entitled:"Cisco Subscriber Edge Services Manager", Published on: Dec. 14 14:18:38 PST 2001, Available at: http://www.cisco.com/warp/public/cc/pd/as/6400/prodlit/esvmn_ov.htm , (pp. 9).

(Continued)

*Primary Examiner*—Quoc D Tran
(74) *Attorney, Agent, or Firm*—Patent Capital Group

(57) ABSTRACT

A service selection gateway (SSG) which permits multiple access quotas associated with a pre-paid service accessed by a user. For example, the user's access may be terminated if the usage exceeds a specified time or volume of data transferred (examples of access quotas). According to another aspect, access of a service is permitted based on different tariffs. Thus, a user may be charged differently depending on the applicable tariff. In an embodiment implemented in the context of pre-paid tariffs, multiple access quotas may be received associated with the same resource, and each quota may be computed according to a corresponding tariff.

21 Claims, 5 Drawing Sheets

OTHER PUBLICATIONS

Entitled:"Service Selection Gateway", Published on: Feb. 25 21:23:17 PST 2002, Available at: http://www.cisco.com/univercd/cc/td/doc./product/dsl_prod/6400/feat_gd/12_2_2/fg2_ssg.htrn, (pp. 82).

Pending U.S. Appl. No. 10/382,347, filed Mar. 4, 2003, Entitled"Method and Apparatus Providing Prepaid Billing for Network Services Using Explicit Service Authorization in an Access Server", Pruss et al., (pp. 94).

Entitled:"SSG Prepaid"; Cisco IOS Release12.2(4)B, Downloaded on Apr. 29, 2003; Available at: http://www.cisco.com/en/US/products/sw/iosswrel/ps5012/products_feature_guide_chapter09186a008008774d.html, (pp. 12).

Entitled, "Trunk Services," Bangalore Telephone Directory 2002-2003, pp. IP-42; Available from: www.bsnl.co.in; Approximate date Dec. 2001.

* cited by examiner

FLEXIBLE BILLING SUPPORT IN A SERVICE SELECTION GATEWAY (SSG)

BACKGROUND OF THE INVENTION

1. Field of the Invention

The present invention relates to telecommunication networks, and more specifically to a service selection gateway (SSG) which provides flexible support in billing for services accessed.

2. Related Art

Service selection gateways (SSG) generally refer to network switches/routers which allow a subscriber to selectively access various services on the Internet. In one common environment, an access provider (e.g., an internet service provider or a shop providing the subscriber terminals to access the services) controls the services a subscriber is permitted to access, and bills the subscriber for accessing/using the services.

A billing server is often used to maintain billing information related to various subscribers. In one approach referred to as a pre-paid model, the billing server keeps track of an amount a subscriber has pre-paid for accessing services. The billing server may, then send an access quota (usually as time or number of bytes) when a subscriber starts (potentially with/after appropriate authentication and authorization) accessing a service.

An SSG then controls access of the subscriber to the service according to the access quota received. For example, if the access quota specifies time, the user may be permitted access to the service for the corresponding amount of time. Alternatively, if the access quota specifies a number of bytes (hereafter "data volume"), that many bytes may be permitted to be transferred (sent and/or received) when accessing the services. Such approach(es) may be unsuitable in several environments/situations.

BRIEF DESCRIPTION OF THE DRAWINGS

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion of the Invention

An aspect of the present invention enables an access provider to specify multiple access quotas associated with a service in a pre-paid billing model, and an SSG may control access to the service based on the access quotas. For example, both time and data volume (number of bytes) may be specified and the SSG may permit access until either one of the access quotas is consumed.

Such an approach of controlling access based on multiple access quotas may be useful in several environments. For example, a mobile telephone may be provided access to services on Internet via an SSG. Assuming for illustration that it is desirable to bill for a specific service based on number of bytes transferred, it may be desirable to bill for the time of connectivity of the mobile telephone to Internet as well, for example, because there is often overhead associated with maintaining the connectivity. Thus, an SSG may provide the ability to bill for both time and data volume simultaneously.

Another aspect of the present invention enables a provider to specify different tariffs associated with different times of access of a service. In an embodiment implemented in the context of pre-paid billing model, a billing server is designed to indicate different access quotas associated with different time durations, and an SSG consumes access quotas in the corresponding time durations. The different access quotas may be computed according to different tariffs (e.g., lower rates in the time durations in which the provider wishes that the service be accessed). Such a feature may be useful to encourage subscribers to access services during off-peak times.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Example Environment

Figure 1:
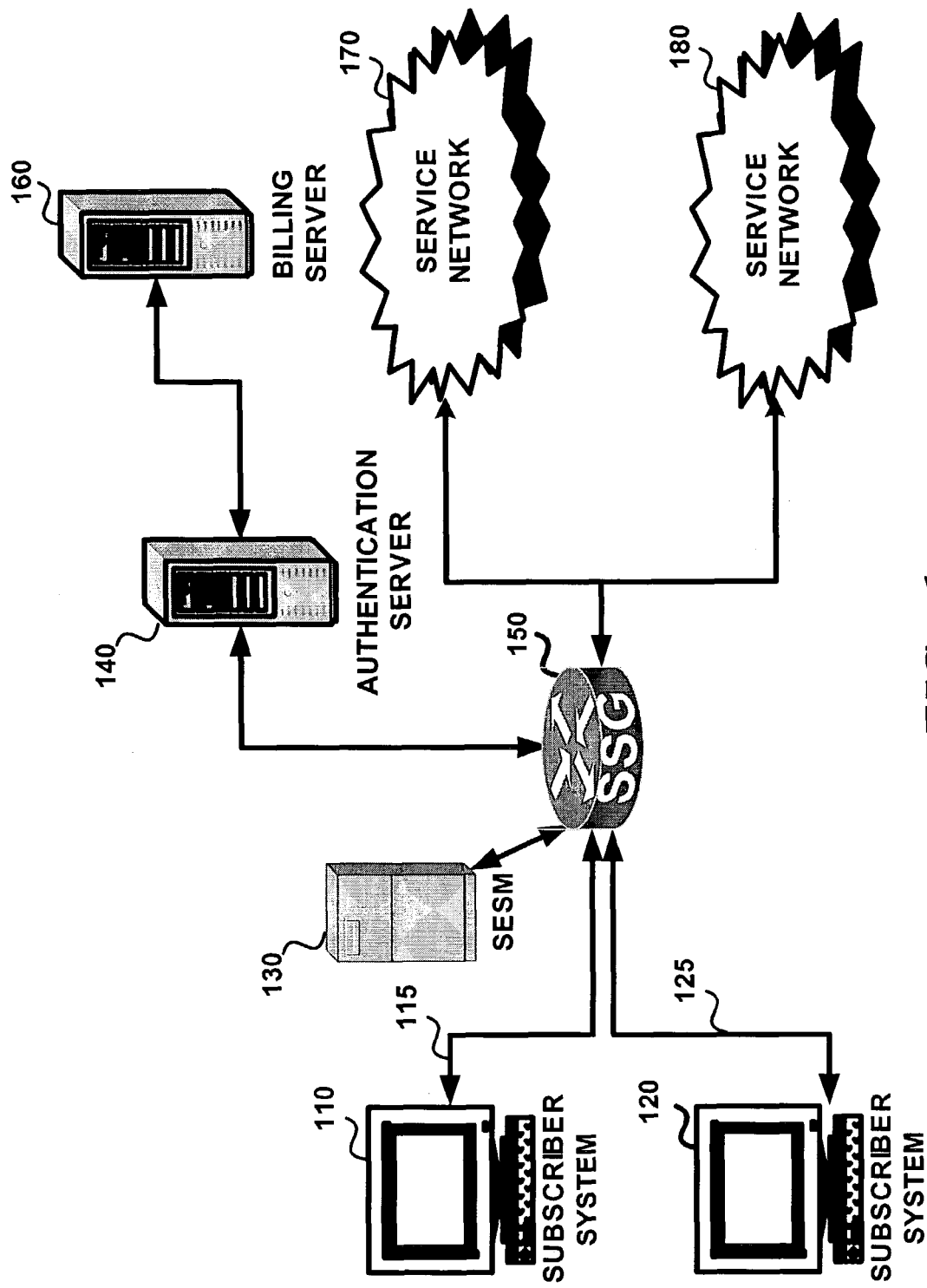
FIG. 1 is a block diagram illustrating an example environment in which the present invention can be implemented.

FIG. 1 is a block diagram illustrating an example environment in which the present invention can be implemented. The environment is shown containing subscriber systems 110 and 120, subscriber edge service manager (SESM) 130, authentication server 140, service selection gateway (SSG) 150, billing server 160, and service networks 170 and 180. Each system is described in further detail below.

Subscriber system 110 represents a system such as a personal computer (PC) often connected to internet using technologies such as DSL, dial-up connections on path 115. Subscriber system 120 represents a system such as a mobile telephone accessing Internet using wireless technologies such as GPRS on GSM, which is described in further detail in a document entitled, "3GPP TS 23.060 V3.8.0 (2001—06); 3rd Generation Partnership Project; Technical Specification Group Services and System Aspects; General Packet Radio Service (GPRS); Service description; Stage 2; (Release 1999)", available from 3GPP support office address, 650 Route des Lucioles—Sophia Antipolis, Valbonne—FRANC3E, Tel.: +33 4 92 94 42 00 (ftp://ftp.3gpp.org/Specs/).

A subscriber may access services provided in the servers present in service networks 170 and 180 using subscriber systems 110/120. Service networks 170 and 180 typically contain many servers (not shown) such as web servers, application servers and network devices (e.g., routers), which provide services (e.g., video applications, database applications, teleconferencing, etc.). Merely for simplicity, it is assumed that a user need not be authenticated for individual services. However, alternative embodiments may be implemented to extend the user interface to require a user to send specific information required for authentication for the specific service as well.

SESM 130 provides an interface for a subscriber to send any necessary information (e.g., user identifier and password) for authenticating the subscriber. The provided information is sent to authentication server 140 by SSG 150. An authentication confirmation message from authentication server 140 may further indicate a list of services the subscriber is allowed to access. SESM 130 may then enable the subscriber to select the desired service(s) of interest by a suitable interface, for example, by sending a HTML page to a web browser executing on subscriber system 110/120. SESM 130 indicates the selected service along with the subscriber identification to SSG 150. Alternatively the user may be logged on to certain services by default without explicit service selection required at SESM 130.

Authentication server 140 authenticates the subscriber based on information received from SESM 130. Authentication server 140 then sends a response containing a list of services (with corresponding service identifiers) the subscriber is permitted to access to SSG 150. The information may be alternatively retrieved from a local database (not shown).

Authentication server 140 may be implemented based on RFC-2865, entitled, "Remote Authentication Dial In User Service (RADIUS)", available from www.ietf.org. In addition, authentication server 140 interfaces with billing server 160 to respond to requests related to access quotas for various services as described in further detail in sections below. In an embodiment, authentication server 140 operates as an intermediary between billing server 160 and SSG 150 in various requests and responses for access quota.

Billing server 160 maintains data indicating the available amount for each subscriber and responds to requests for access quotas from authentication server 140. The access quota requests generally contain two types—(1) initial quota requests (before a service is accessed); and (2) additional quota requests (when previous allocated quota is used or about to be used completely).

In general, a pre-payment amount (e.g., in dollar denomination) may be received associated with each subscriber (potentially including a group of people treated as a subscriber), and the amount used for allocating resources may be deducted from the pre-payment amount to generate the available amount. If any allocated resource is not completely used (as indicated by SSG 150), the equivalent amount may be credited back to the available amount for the subscriber.

Billing server 160 may be provided with the ability to compute the conversion between multiple access quota types and the denomination of available amount. For illustration, assuming the available amount is represented in dollars, the allocated time and/or volume of bytes may be converted into corresponding number of dollars (e.g., based on a cost of one dollar for 30 minutes of access or $5 per 10 Mege bytes of data).

SSG 150 forwards packets between various systems (subscriber systems 110/120, SESM 130 and authentication server 140) when the subscriber is being authenticated and when the subscriber selects a service of interest to access. SSG 150 may thus receive a subscriber identifier and a service identifier from SESM 130. An aspect of the present invention enables SSG 150 to control access to the corresponding service based on multiple access quota types, as described below in further detail with reference to examples.

3. Allowing Access

Figure 2:
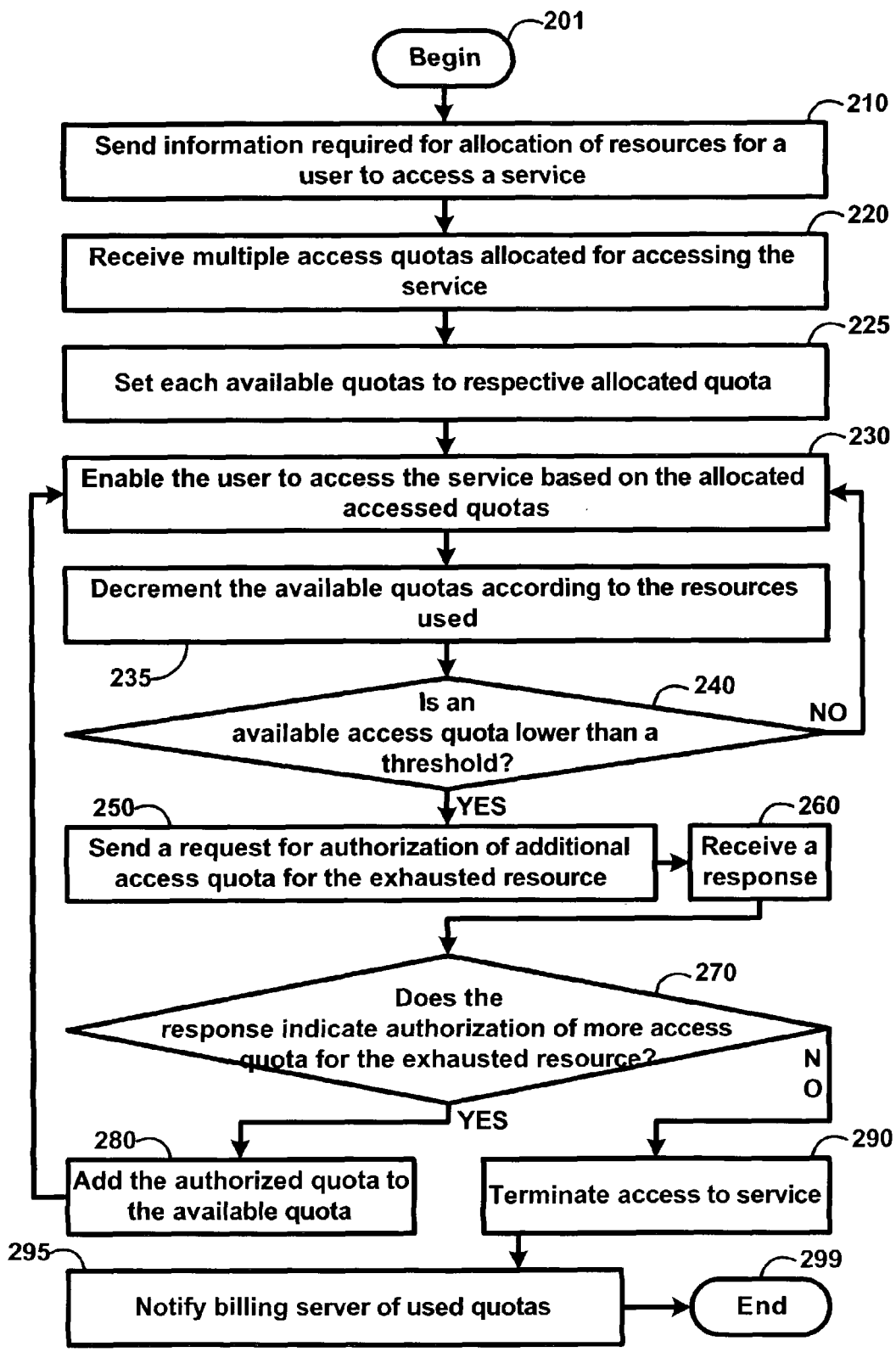
FIG. 2 is a flow chart illustrating a method by which SSG receives allocation of access quotas in accordance with the present invention.

FIG. 2 is a flow chart illustrating a method using which a SSG may enable a subscriber to access services according to an aspect of the present invention. The flow-chart is described with reference to the systems of FIG. 1. The invention can be implemented in other environments as well. The method begins in step 201, in which control immediately passes to step 210.

In step 210, SSG 150 sends information required for allocation of resources for a user to access a service. The information may contain a user identifier (e.g., generated earlier by authentication server 140) and a service identifier corresponding to the service selected earlier by the user.

In step 220, SSG 150 receives multiple access quotas allocated for accessing the service. For illustration, it is assumed that SSG 150 receives 30 minutes of time and 5 Mega bytes of volume of bytes, as access quotas in response to sending the information of step 210. Each available quota may be set to corresponding received allocated quota in step 225.

In step 230, SSG 150 enables the user to access the service based on the allocated accessed quotas. In general, SSG 150 forwards the packets between the subscriber system (presently used by the user) and the service network (containing the service being accessed) to enable the access.

In step 235, the available quotas are decremented according to the usage of the respective resources. In the illustrative example of above, SSG 150 measures the bytes transferred and also the time elapsed, and decrements the corresponding available quota.

In step 240, SSG 150 determines if any of the available quota is less than a corresponding threshold limit. In an embodiment, the determination with respect to time based access quota is performed using timers, and the determination for volume based access quota is based on the number of bytes in each packet forwarded for the user/service. If none of the available quota is less than the corresponding threshold, control passes to step 230, or else control passes to step 250.

In the illustrative example of above, assuming that the threshold values for volume and time are respectively 0.2 Mega Bytes and 0.5 minutes, and further assuming that the user has used 4.81 Mega bytes of quota in 20 minutes, the volume quota remaining (0.19 Mega bytes) is below the threshold (e.g., <0.2 Mega bytes) and the time quota remaining (10 Minutes) is above the corresponding threshold. Thus, the volume quota, representing an exhausted resource, forces control to pass to step 250.

In step 250, SSG 150 sends a request for authorization of additional access quota for the exhausted resource. In the above example, an authorization request for allocation of volume resource may be sent by SSG 150 (as the remaining volume resource is less than the threshold). In an embodiment, the request may contain the status of all the available quotas.

In step 260, SSG 150 receives the response for the request of step 250. The response indicates the additional quota allocated for the exhausted resource. According to one convention, a value of zero (or a negative number) indicates that such additional quota has not been allocated.

In step 270, SSG 150 determines whether the response (of step 260) indicates authorization of more access quota for the exhausted resource. If the response contains such authorization, control is transferred to step 280. Otherwise, control is transferred to step 290.

In step 280, SSG 150 adds the access quota present in the response to the available access quota. In the above example, if 5 mega bytes of additional access quota is allocated, the available access quota becomes 5.10 mega bytes and control is transferred to step 230.

In step 290, the access to service is terminated once at least one of the available resources reaches zero. Thus, access to the pre-paid service is permitted only when none of the access quotas is exhausted.

In step 295, SSG 150 notifies billing server 160 (via authentication server 140) of the used quotas. Billing server 160 converts the unused resources back to the denomination in which available amount is being maintained, and credits the user (or service) account with the unused portion. The method ends in step 299.

Thus, the method of FIG. 2 can be used to control access to services based on multiple access quotas. Another aspect of the present invention enables a service to be accessed with different tariffs without disruption. For example, a higher tariff may be applicable until 9 PM and a lower tariff thereafter each business day. Thus, an access (service provider or network provider) provider may specify different tariffs associated with different times of access, and the access is controlled accordingly as described below.

4. Different Tariffs for Different Time Durations

Figure 3:
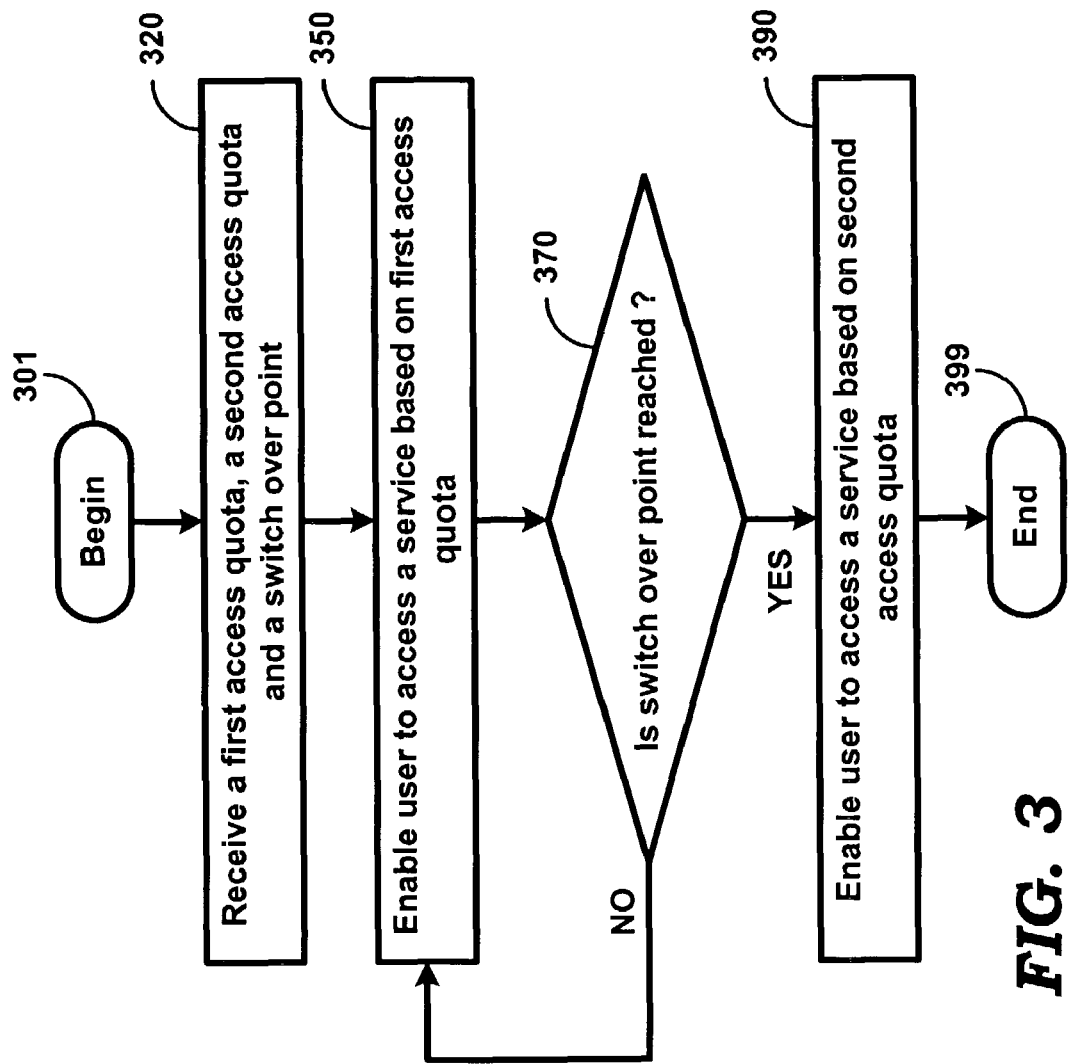
FIG. 3 is a flow chart illustrating a method by which SSG receives allocation of access quota based on time-of-day in accordance with the present invention.

FIG. 3 is a flow-chart illustrating the manner in which an SSG enables a subscriber to access a service with different tariffs in different time durations in an embodiment of the present invention. As with FIG. 2, the flow-chart is described with reference to the systems of FIG. 1 for illustration only. The method can be implemented in other environments as well. The method begins in step 301 and the control immediately passes to step 320.

In step 320, SSG 150 receives data representing a first access quota, a second access quota and a switch-over point. The data may be received, for example, in response to various requests related to access quotas to billing server 160 for accessing the service of interest indicated by a user. As a result, different tariff structures and switch-over points may be associated with different services/users.

For illustration, in response to a single request for allocation of a resource, SSG 150 receives 5 mega bytes and 10 mega bytes with a switch-over point equaling 9 PM on the chronological clock (e.g., in terms of GMT or a local time, per any convention). The 5 Mega bytes and 10 Mega bytes may have been respectively computed using a first tariff (e.g., $1=1 Mega bytes) and a second tariff (e.g., $1=2 Mega bytes).

In step 350, SSG 150 enables subscriber to access a service based on the first access quota. If the first access quota is exhausted, SSG 150 may request for allocation of additional quota (which would again be computed using first tariff and second tariff) as described above.

In step 370, SSG 150 examines whether the switch-over point is reached. Control passes to step 390 if the switch-over point is reached, otherwise control passes to step 350. In the above example, SSG 150 determines whether switch-over point of 9 PM has been reached and control is transferred to step 350 if 9 PM is not reached otherwise control is transferred to step 390. Thus, access continues using the first tariff.

In step 390, SSG 150 enables subscriber to access the service based on second access quota. For example, subscriber may be allowed to access services based on 10 mega bytes access quota. As noted above, the second access quota may be computed based on a lower tariff (i.e., $1=2 mega byte). The method ends in step 399.

Thus, the method of FIG. 3 enables an SSG to control access to a service based on different tariffs at different time durations. In addition, the change from one tariff to other does not disrupt the service and continuity (in accessing the service) may be maintained even with the change of tariffs.

The approach of FIG. 3 has the advantage that systems such as billing servers are not loaded with requests for access quota requests around the switch-over time. For example, in an alternative embodiment, an SSG may send a request for additional access quota at the switch-over time, and receive the requested quota computed based on the new tariff.

Such an approach has the advantage that access quotas are not allocated merely for future use (i.e., after switch-over point) and the available amount is allocated for immediate use (which might be more desirable at least in some situations). However, the disadvantage is that many requests related to switch-over may need to be processed at the same time if the switch-over time for many services (even of different users) is the same.

Thus, the approaches of above can be used to provide flexible billing support in a service selection gateway. However, such support may require communication and corresponding packet formats between systems. Some example formats are described below for illustration.

5. Packet Formats for Communication Between SSG and Authentication Server

In an embodiment, SSG 150 and authentication server 140 exchange packets using RADIUS protocol described in further detail in RFC 2865, noted above. Accordingly, various extensions are provided within the frame-work of RADIUS protocol to support various features of the present invention, as described below in further detail.

In an embodiment, the information exchange is provided by using vendor-specific fields permitted according to RADIUS protocol. As noted in RFC 2865, the first byte represents a code, which indicates whether the packet relates to an access-request, access-accept, access-reject, etc. The packet contains various other fields such as length (to indicate the number of bytes in the packet), authentication information (including the user identifier), etc.

As relevant to various aspects of the present invention, each packet may contain several attributes, which can be used to exchange various pieces of information. In an embodiment, the first byte of such attribute(s) (i.e., byte 25) is set to a value of 26 to indicate that the attribute is vendor specific. The remaining bytes may be defined as follows:

Byte 26: the length of the attribute;

Bytes 27-30: Vendor identifier (Can be set to a value of 0 in the high-order octet (byte 3) and the lower order 3 bytes may be set to a value reflecting SMI Network Management Private Enterprise Code of the vendor in network byte order (e.g., 9 to indicate Cisco Systems, the assignee of the subject patent application) as defined in RFC 1700 entitled, "Assigned Numbers")

Byte 31: Identifier of the attribute (as relevant to the description above, it can take on one of three values). The remaining packet content depends on the value in this field.

It may be noted that the byte position for each of the attributes below is described as if the starting position is byte 31 for illustration. However, a single packet can contain multiple attributes cascaded in sequence (in the type-length-variables format), and accordingly each attribute would start with the corresponding offset.

With reference to initial authorization and setup of access to a service, it may be desirable for SSG 150 to receive information that the service is a pre-paid service (so that SSG 150 can start requesting access quotas). The corresponding data may be stored locally in the SSG, or alternatively may need to be communicated from authentication server 140. When such a communication is needed to SSG 150, byte 31 is set to a value of 251 (to indicate service information) and the remaining bytes of the attribute may be set as follows:

Byte 32: Length of the present sub-attribute;
Byte 33: Code of Z to indicate that the service is a pre-paid service subject to authorization; and
Bytes 34-35: TCP redirection group name as defined on SSG 150 (not relevant to an understanding of various aspects of the present invention).

With respect to requests related to various access quotas (steps 210 and 250), the user identifier and service identifier may need to be sent. The user identifier may be sent using attributed supported by the RADIUS protocol. To send the service identifier a new attribute consistent with above in which byte 31 is set to 253 may be used. The remaining bytes may be defined as follows:

Byte 32: Length of the present sub-attribute;
Byte 33: Code of N to indicate the following value is a service name;
Bytes 34 onwards: The service name up to a byte determined by byte 32.

With respect to receiving multiple access quotas initially, byte 31 may be set equal to 253 to indicate that the packet contains a request or a response (which would be clear from the sender/recipient combination) for access quota. The remaining bytes may be defined as follows:

Byte 32: the length of the sub-attribute;
Byte 33: indicates the control information code for pre-paid quota (may be set equal to 'Q' to indicate pre-paid quota);
Byte 34: indicates quota sub-code representing the access quota type (may be set to either 'T' or 'V' respectively representing time or volume type of access quota);
Bytes 35-36: contain a numeric string representing the quota value.

The fields in bytes 32-36 may be repeated to indicate additional access quotas (i.e., both T and V type in the above example) using which the service is to be accessed. When SSG 150 sends a subsequent request for additional quota, bytes 35 and 36 represent an amount of resource (bytes in case of volume and seconds in case of time) consumed since the beginning of the service. In a response (byte 1=2 to indicate access-accept) received by SSG 150, bytes 35-36 indicate the additional allocated resource.

For example, a value of 1000 in bytes 35-36 in combination with a value of V in byte 34, indicates that 1000 bytes of volume quota is allocated to requesting SSG. In other words, authentication server 140 may merely need to replace bytes 35-36 with appropriate values, based on interaction with billing server 160.

With respect to using different tariffs at different times, byte 31 may be set equal to 253 to indicate that the packet contains a request or a response (which would be clear from the sender/recipient combination) related to access quotas. The remaining bytes may be defined as follows:

Byte 32: the length of the sub-attribute;
Byte 33: indicates the control information code for pre-paid quota (may be set equal to 'Q' to indicate pre-paid quota);
Byte 34: set to X to indicate different tariffs follow;
Bytes 35-36: Switch time specified in number of seconds from a present time;
Bytes 37-38: Pre-switch access quota in number of bytes; and
Bytes 39-40: Post-switch access quota in number of bytes.

With respect to requesting additional quota prior to the switch (to a different tariff), the format described above in which bytes 33 and 34 are respectively set to Q and V, may be used. The response is also received in the same format.

However, when the post-switch access quota is (about to be) exhausted, SSG 150 may communicate the unused quota to billing server 160 as well such that the user account is credited back with an equivalent denomination (dollar value). To enable such a communication to billing server 160, two attributes may be encoded in a request packet. The first attribute may be encoded according to the type described above which has bytes 33 and 34 respectively set equal to Q and V.

With respect to the second attribute, byte 31 may again be set to 253, and the remaining bytes may be set as follows:

Byte 32: the length of the sub-attribute;
Byte 33: set to 'Q' to indicate following data relates to pre-paid quota;
Byte 34: set to 'B' to indicate that the below data indicates total volumes used since switch-over to different/new tariff;
Bytes 35-36: The byte count representing number of bytes transferred since the switch-over.

Based on the values in the two attributes, billing server 160 may determine the unused portion in the pre-switch quota, and compute the quotas to be used thereafter.

Any of the response packets (including multiple access quotas or single access quota) may be used to control access to the service thereafter.

It may be further desirable to credit back a user account with any unused access quota(s). In general, the accounting stop packet described in RFC 2866 entitled, "RADIUS Accounting", available at www.ietf.org, is used when a service is terminated. The protocol may be further extended to send an attribute related to unused access quota(s).

Such extensions may be implemented in a known way at least based on the disclosure provided above. Similarly, the communication between authentication server 140 and billing server 160 may also be implemented in a known way to enable the requests to be passed and the responses to be generated.

Thus, the packet formats described above can be used to implement various aspects of the present invention. An example embodiment of SSG is described in further detail below.

6. Service Selection Gateway

Figure 4:
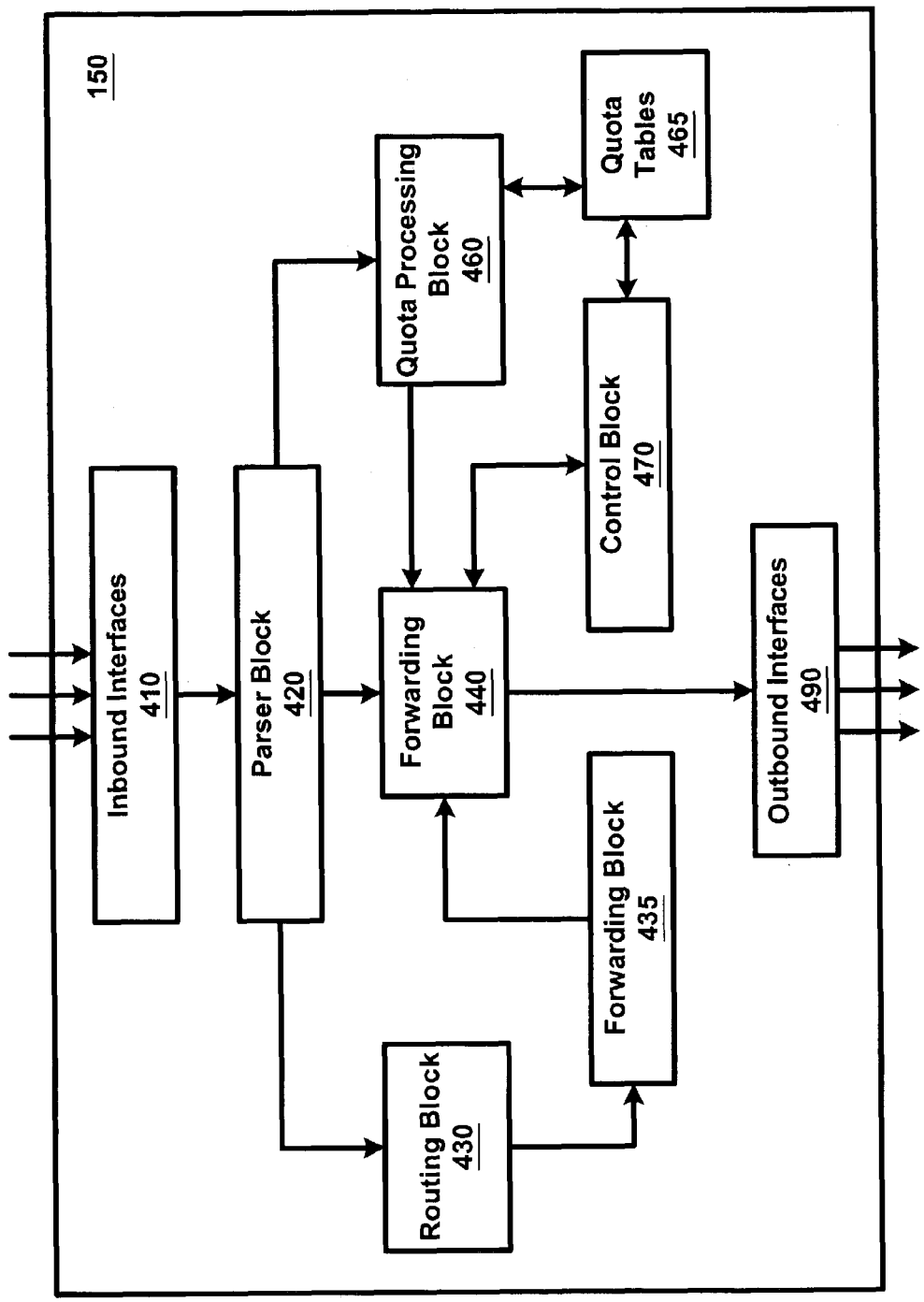
FIG. 4 is a block diagram illustrating the internals of an embodiment of a service selection gateway (SSG) provided in accordance with the present invention.

FIG. 4 is a block diagram illustrating the details of an embodiment of service selection gateway (SSG) 150 as relevant to various aspects of the present invention. SSG 150 is shown containing inbound interfaces 410, parser block 420, routing block 430, forwarding block 440, quota processing block 460, control block 470, and outbound interfaces 490. Each component is described in further detail below.

Inbound interfaces 410 provide the electrical, physical, and protocol interfaces to receive data packets from various subscriber systems, authentication servers, service networks, SESM, etc. The received packets are forwarded to parser block 420 in appropriate format (e.g., IP packets). Similarly, outbound interfaces 490 provide the electrical, physical, and protocol interfaces to send data packets from various subscriber systems, authentication servers, service networks, SESM, etc. Both inbound interface 410 and outbound interface 490 may be implemented in a known way.

Parser block 420 examines each received packet and forwards the received packets to one of forwarding block 440, forwarding block 440, quota processing block 460 and routing block 430. The specific component to forward to depends generally on the destination address and other header contents. Parser block 420 may be implemented in a known way.

Routing block 430 receives packets related to various routing protocols (OSPF, RIP, etc.) and populates the entries in forwarding tables 435. The entries in forwarding tables 435 may be configured manually as well. In general, the entries specify the manner (next hop address and/or specific interface) in which each IP packet is to be forwarded/processed. Routing block 430 may be implemented in a known way.

Forwarding block 440 receives packets from parser block 420 and quota processing block 460, and forwards each received packet generally by accessing forwarding tables 435 based on the destination address contained in the packet. However, packets related to services may be forwarded/blocked depending on the access quotas allocated and the amount of usage as described below in further detail.

Control block 470 measures the amount of usage of each resource by a user (or subscriber) in accessing a corresponding service, and determines whether the usage of the quota is within any applicable limits. If a user/service combination exceeds a permitted limit (with reference to any resource), control block 470 may interface with forwarding block 440 to block transfer of the corresponding packets to block access to the service (by the user). The applicable limits (for each resource/user/service combination) may be provided by quota tables 465.

For example, with respect to volume of bytes transferred, control block 470 may receive (from forwarding block 440) a number of bytes transferred for the user/service combination when a related data packet is transferred, and keep track of the transferred byte count. If the byte count exceeds the allocated quota, forwarding block 440 may be notified to block the packets related to the user/service combination. Similarly, time of access also can be measured from a time a user starts accessing a service.

Quota processing block 460 determines any access quotas that may need to be enforced with reference to each user/service combination, and sets the entries in quota tables 465 accordingly. Any necessary communication with billing server 160 (or authentication server 140) is implemented by sending the appropriate packets to forwarding block 440. The corresponding responses are received from parser block 420.

In an embodiment, quota processing block 460 needs to determine whether a service sought to be accessed is a pre-paid service, and the initial access quotas for pre-paid services. A response may be received in the packet/attribute format described above (byte 31=251 and byte 33=Z) to indicate that a service is a pre-paid service.

Quota processing block 460 may then request access quota(s) by sending the appropriate user and service identifiers (using packet formats consistent with RADIUS protocol, also as described above). The response packet may specify multiple access quotas and or different tariffs for a quota type also, for example, as described above. Quota processing block 460 sets the entries in quota tables 465 according to such responses, and control block 470 controls access of the user to the service as described above.

The additional access quotas, access quota based on different tariffs and switch-over time received (using packet formats described in a section above and methods as described in FIGS. 2 and 3) may be used to enable a user to access the service and the corresponding entries in the quota tables 465 may also be updated.

Quota processing block 460 monitors the entries in quota tables 465 to determine whether any available quota falls below a corresponding threshold (or the resource is (about to be) exhausted), and interfaces with billing server 160 (via authentication server 140) to receive additional access quota. The entries in quota tables 465 may be updated accordingly. In an embodiment, quota tables 465 stores the total allocated quota and the total resource usage for each quota type (for a user/service combination). The available quota and the unused quota are computed based on the two totals.

Thus, the embodiment of FIG. 4 can be used to provide flexible billing support as may be desirable in various environments. It should be understood that the different components of an SSG can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing SSG 150 with a desired mix of hardware, software and/or firmware. An embodiment implemented substantially in software is described below.

7. Software Implementation

Figure 5:
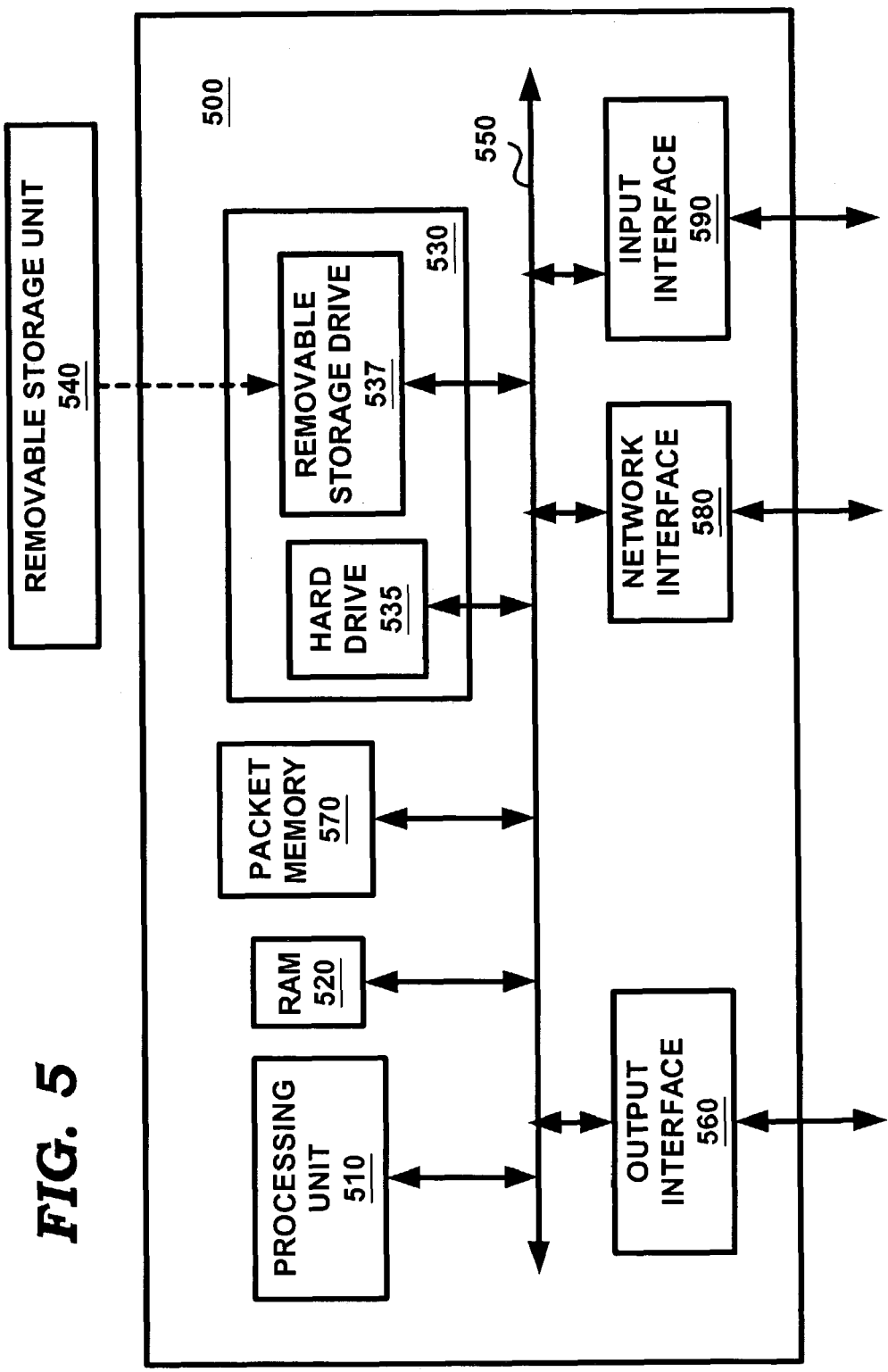
FIG. 5 is a block diagram illustrating the details of an embodiment of an service selection gateway implemented substantially in the form of software according to an aspect of the present invention.

FIG. 5 is a block diagram illustrating the details of SSG 150 in one embodiment. SSG 150 is shown containing processing unit 510, random access memory (RAM) 520, secondary memory 530, output interface 560, packet memory 570, network interface 580 and input interface 590. Each component is described in further detail below.

Input interface 590 (e.g., interface with a key-board and/or mouse, not shown) enables a user/administrator to provide any necessary inputs to SSG 150. Output interface 560 provides output signals (e.g., display signals to a display unit, not shown), and the two interfaces together can form the basis for a suitable user interface for an administrator to interact with SSG 150.

Network interface 580 may enable SSG 150 to send/receive data packets to/from other systems (110, 120, 130, 140, 170, and 180) on corresponding paths using protocols such as internet protocol (IP). Network interface 580, output interface 560 and input interface 590 can be implemented in a known way.

RAM 520, secondary memory 530, and packet memory 570 may together be referred to as a memory. RAM 520 receives instructions and data on path 550 (which may represent several buses) from secondary memory 530, and provides the instructions to processing unit 510 for execution. Packet memory 570 stores (queues) packets waiting to be forwarded (or otherwise processed) on different ports.

Secondary memory 530 may contain units such as hard drive 535 and removable storage drive 537. Secondary memory 530 may store the software instructions and data, which enable SSG 150 to provide several features in accordance with the present invention.

Some or all of the data and instructions may be provided on removable storage unit 540 (or from a network using protocols such as Internet Protocol), and the data and instructions may be read and provided by removable storage drive 537 to processing unit 510. Floppy drive, magnetic tape drive, CD- ROM drive, DVD Drive, Flash memory, removable memory chip (PCMCIA Card, EPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520.

In general, processing unit 510 reads sequences of instructions from various types of memory medium (including RAM 520, storage 530 and removable storage unit 540), and executes the instructions to provide various features of the present invention described above.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of supporting a user to access a pre-paid service, said method comprising:
   sending information for allocation of resources to access said pre-paid service;
   receiving in a response a plurality of access quotas, said plurality of access quotas being related to said resources required to access said pre-paid service;
   permitting access from a subscriber system used by said user to said pre-paid service, wherein the pre-paid service is associated with a video application, and wherein user authentication is used to permit video data resident on a server to be accessed by the subscriber system, wherein an authentication message is communicated to the user and the user is provided with a hypertext markup language (HTML) page that includes a list of video services from which the video application is selected in order to initiate the video application;
   determining whether an available quota is less than a threshold, wherein said available quota equals a corresponding one of said plurality of access quotas less usage of a corresponding resource;
   sending a request for allocation of more of said corresponding one of said plurality of access quotas if said available quota is less than said threshold, wherein a first tariff is applied to a selected one of the resources, the first tariff being associated with a cost that is different from a standard cost associated with the selected resource, and wherein a switchover time is configured such that when the switchover time is reached, the first tariff is no longer used and a second tariff applies to the selected resource, wherein said plurality of access quotas comprise a time to access said pre-paid service and a number of bytes permitted to be transferred;
   terminating access to said pre-paid service; and
   sending an accounting stop request along with unused portions of said plurality of access quotas.

2. The method of claim 1, wherein said information comprises a user identifier and a service identifier identifying said user and said pre-paid service respectively.

3. The method of claim 1, further comprising:
   receiving in another response data indicating whether more of said corresponding one of said plurality of access quotas has been allocated and an allocated amount; and
   adding said allocated amount to said available quota.

4. The method of claim 3, wherein said request contains data indicating an amount of usage of said corresponding resource.

5. The method of claim 1, wherein said response and said information are encoded according to RADIUS protocol.

6. A computer readable medium carrying one or more sequences of instructions for causing a service selection gateway (SSG) to support a user to access a pre-paid service, wherein execution of said one or more sequences of instructions by one or more processors contained in said SSG causes said one or more processors to perform the actions of:
   sending information for allocation of resources to access said pre-paid service;
   receiving in a response a plurality of access quotas, said plurality of access quotas being related to said resources required to access said pre-paid service; and
   permitting access from a subscriber system used by said user to said pre-paid service when none of said plurality of access quotas is exhausted, wherein the pre-paid service is associated with a video application, and wherein user authentication is used to permit video data resident on a server to be accessed by the subscriber system, wherein an authentication message is communicated to the user and the user is provided with a hypertext markup language (HTML) page that includes a list of video services from which the video application is selected in order to initiate the video application;
   determining whether an available quota is less than a threshold, wherein said available quota equals a corresponding one of said plurality of access quotas less usage of a corresponding resource, wherein a first tariff is applied to a selected one of the resources, the first tariff being associated with a cost that is different from a standard cost associated with the selected resource, and wherein a switchover time is configured such that when the switchover time is reached, the first tariff is no longer used and a second tariff applies to the selected resource;
   sending a request for allocation of more of said corresponding one of said plurality of access quotas if said available quota is less than said threshold, wherein said plurality of access quotas comprise a time to access said pre-paid service and a number of bytes permitted to be transferred;
   terminating access to said pre-paid service; and
   sending an accounting stop request along with unused portions of said plurality of access quotas.

7. The computer readable medium of claim 6, wherein said information comprises a user identifier and a service identifier identifying said user and said pre-paid service respectively.

8. The computer readable medium of claim 6, further comprising:
   receiving in another response data indicating whether more of said corresponding one of said plurality of access quotas has been allocated and an allocated amount; and
   adding said allocated amount to said available quota.

9. The computer readable medium of claim 8, wherein said request contains data indicating an amount of usage of said corresponding resource.

10. The computer readable medium of claim 6, wherein said response and said information are encoded according to RADIUS protocol.

11. A service selection gateway (SSG) supporting a user to access a pre-paid service offered by a service network, said SSG comprising:
- a forwarding block to forward a plurality of packets between said service network and a subscriber system used by said user;
- a quota processing lock to send a first request for allocation of resources to access said pre-paid service, said quota processing block receiving in a response a plurality of access quotas, said plurality of access quotas being related to said resources to access said pre-paid service; and
- a control block coupled to said forwarding block, said control block to permit access from a subscriber system used by said user to said pre-paid service when none of said plurality of access quotas is exhausted, wherein the pre-paid service is associated with a video application, and wherein user authentication is used to permit video data resident on a server to be accessed by the subscriber system, wherein an authentication message is communicated to the user and the user is provided with a hypertext markup language (HTML) page that includes a list of video services from which the video application is selected in order to initiate the video application, said quota processing block to further determine whether an available quota is less than a threshold, and to send a request for allocation of more of said corresponding one of said plurality of access quotas if said available quota is less than said threshold, wherein a first tariff is applied to a selected one of the resources, the first tariff being associated with a cost that is different from a standard cost associated with the selected resource, and wherein a switchover time is configured such that when the switchover time is reached, the first tariff is no longer used and a second tariff applies to the selected resource, wherein said available quota equals a corresponding one of said plurality of access quotas less usage of a corresponding resource and said threshold is less than the corresponding one of said plurality of access quotas received in said response, wherein said plurality of access quotas comprise a time to access said pre-paid service and a number of bytes permitted to be transferred, and wherein access to said pre-paid service is subsequently terminated, and wherein an accounting stop request along with unused portions of said plurality of access quotas is communicated.

12. The SSG of claim 11, wherein said information comprises a user identifier and a service identifier identifying said user and said pre-paid service respectively.

13. The SSG of claim 12, further comprising, a memory storing information necessary to compute an available quota for each of said plurality of access quotas, wherein said quota processing stores said plurality of access quotas in said memory at an inception of said pre-paid service.

14. The SSG of claim 13, said quota processing block receiving in another response data indicating whether more of said corresponding one of said plurality of access quotas has been allocated and an allocated amount and adding said allocated amount to said available quota.

15. The SSG of claim 11, wherein said request contains data indicating an amount of usage of said corresponding resource.

16. The SSG of claim 11, wherein said response and said information are encoded according to RADIUS protocol.

17. A service selection gateway (SSG) supporting a user to access a pre-paid service offered by a service network, said SSG comprising:
- means for sending information for allocation of resources to access said pre-paid service;
- means for receiving in a response a plurality of access quotas, said plurality of access quotas being related to said resources required to access said pre-paid service; and
- means for permitting access from a subscriber system used by said user to said pre-paid service when none of said plurality of access quotas is exhausted, wherein the pre-paid service is associated with a video application, and wherein user authentication is used to permit video data resident on a server to be accessed by the subscriber system, wherein an authentication message is communicated to the user and the user is provided with a hypertext markup language (HTML) page that includes a list of video services from which the video application is selected in order to initiate the video application;
- means for determining whether an available quota is less than a threshold, wherein said available quota equals a corresponding one of said plurality of access quotas less usage of a corresponding resource;
- means for sending a request for allocation of more of said corresponding one of sad plurality of access quotas if said available quota is less than said threshold, wherein a first tariff is applied to a selected one of the resources, the first tariff being associated with a cost that is different from a standard cost associated with the selected resource, and wherein a switchover time is configured such that when the switchover time is reached, the first tariff is no longer used and a second tariff applies to the selected resource, wherein said plurality of access quotas comprise a time to access said pre-paid service and a number of bytes permitted to be transferred;
- means for terminating access to said pre-paid service; and
- means for sending an accounting stop request along with unused portions of said plurality of access quotas.

18. The SSG of claim 17, wherein said information comprises a user identifier and a service identifier identifying said user and said pre-paid service respectively.

19. The SSG of claim 17, further comprising:
- means for receiving in another response data indicating whether more of said corresponding one of said plurality of access quotas has been allocated and an allocated amount; and
- means for adding said allocated amount to said available quota.

20. The SSG of claim 19, wherein said request contains data indicating an amount of usage of said corresponding resource.

21. The SSG of claim 17, wherein said response and said information are encoded according to RADIUS protocol.

* * * * *